J. H. SHAW.
JOINT FOR TAKE DOWN SQUARES.
APPLICATION FILED JULY 27, 1912.
1,121,766.
Patented Dec. 22, 1914.
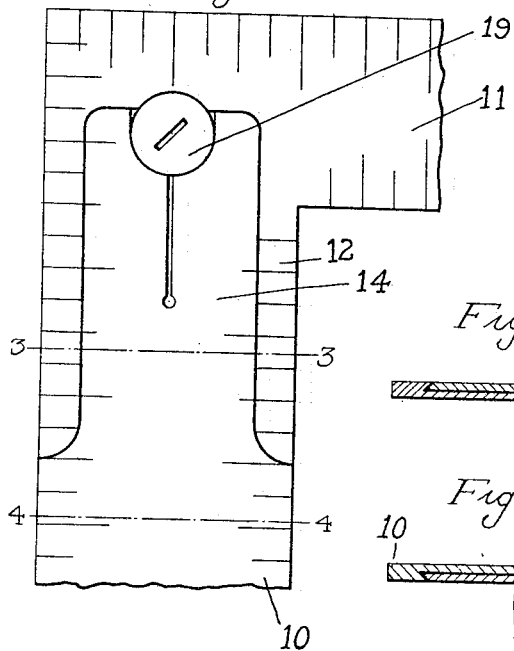
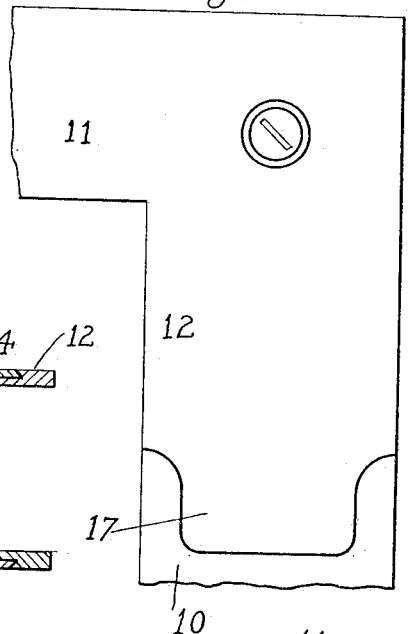
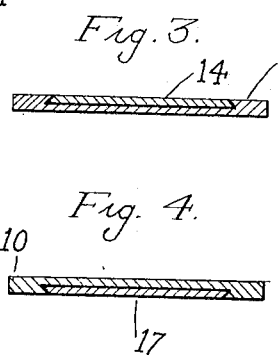
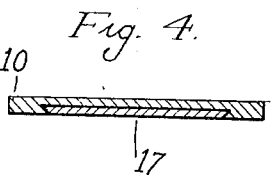
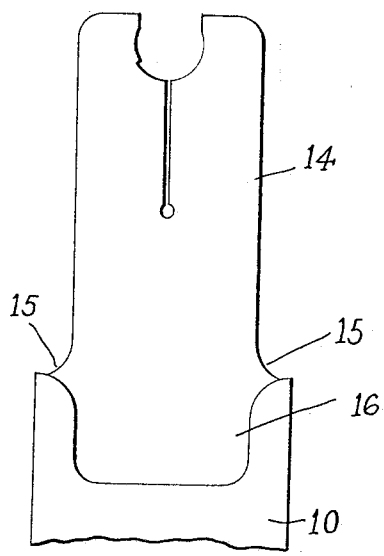
WITNESSES:
F. A. Carlson
Mary E. Fuller
INVENTOR:
John H. Shaw,
BY
Beacht Fisher
ATTORNEYS.

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

JOINT FOR TAKE-DOWN SQUARES.

1,121,766.   Specification of Letters Patent.   Patented Dec. 22, 1914.

Application filed July 27, 1912. Serial No. 711,882.

*To all whom it may concern:*

Be it known that I, JOHN H. SHAW, a citizen of the United States, residing in New Haven, county of New Haven, State of Connecticut, have invented certain new and useful Improvements in Joints for Take-Down Squares, of which the following is a full, clear, and exact description.

This invention relates to separable or take down carpenters' squares, and particularly to the form of the joint between the separable arms of the square *i. e.* between the tongue and body.

In the usual forms of take down squares one of the arms is provided with an extension at one end, of reduced width and thickness, to fit within a corresponding groove or mortise in the other arm, and the extension of the first arm forms in connection with the body portion of such arm, a shoulder directed transversely of the arm and extending approximately throughout the width of the latter. This construction has the disadvantage that the arm having the aforesaid extension is considerably weakened along a straight transverse line so that it may be easily bent or deformed at the junction of the extension with the main portion of the arm. Devices of this kind are often subjected to hard usage and when constructed in the manner stated there is nothing to prevent the main portion of the arm having the extension from being bent out of the plane of the extension on an axis coincident with the transverse line of junction.

The object of the present invention is to overcome these defects and to provide a separable square in which the joint is reinforced in a simple and effective manner so that the square is practically as strong at the joint as at any other point.

To these and other ends, the invention consists in the novel features and combinations of parts to be hereinafter described and claimed.

In the accompanying drawing, Figure 1 is a fragmentary face view of a square embodying the invention, Fig. 2 is a rear view corresponding to Fig. 1, Figs. 3 and 4 are sections on lines 3—3 and 4—4 respectively of Fig. 1, Fig. 5 is a rear view of one of the arms, detached, and Fig. 6 is a front view of the other arm, detached.

Referring to the drawing, the square is shown as comprising an arm 10 separably secured to a second arm 11. The arm 10 may be the so-called body of the square and the arm 11 may be the tongue thereof, but this is not a material part of the invention. The arm 11 is provided with a transverse extension 12 forming an elbow, and said extension is provided with an undercut groove or mortise 13 to receive the extension 14 of the arm 10. The extension 14 is of reduced width and thickness as compared with the body portion of the arm 10, being preferably merged into the latter at the sides by curved portions 15 in order to prevent the formation of sharp corners and thereby reinforce the junction against breakage.

At the face of the arm 10 which is opposite the extension 14, said arm is provided with an undercut groove 16 in line with the extension 14. This groove 16 extends backward from the junction of the extension with the body of the arm and is adapted to receive a correspondingly shaped tongue 17 extending longitudinally from the end of the part 12 of the other arm 11. The tongue 17 is in alinement with the groove 13 and said tongue 17 is joined with the extension or elbow portion 12 by means of curved portions 18 at the sides similar to the portions 15. The grooves 13 and 16 are curved at the open ends in order to conform to the curved portions 15 and 18 respectively of the tongues 14 and 17 respectively, as will be understood.

The assembled position of the parts is shown in Figs. 1 and 2 and it will be noted that the tongue 14 of the arm 10 is snugly fitted in the groove 13 of the arm 11 at one face of the square and at the opposite face the tongue 17 of the arm 11 fits snugly within the groove 16 of the arm 10. By providing the undercut groove 16 and tongue 17 it is obviously impossible to bend the body of the arm 10 out of the plane of the extension 14 unless a very large amount of force is used. On the other hand, the junction of the extension 12 and tongue 17 is similarly reinforced by the tongue 14 and groove 13 at the opposite face of the square.

The tongue and groove at one face of the square is supplemented and reinforced by a tongue and groove at the opposite face of the square, so that the bending of either arm at the joint, in either direction, is absolutely prevented for all practical purposes, and hence the square will not be deformed in this manner, even if subjected to very hard usage. Moreover, there is in reality no weakened transverse line on the square, due to the provision of the joint, owing to the fact that the neck portions of the respective tongues 14, 17 are substantially non-coincident with each other when the square is assembled. By referring to Fig. 5, for example, it will be observed that the edges 15 of the neck portion of the tongue 14 are curved so as to diverge in a direction opposite to that of the divergence of the edges at the flared open end of the groove 16, which last named edges are shaped to conform to the edges 18 of the tongue 17. In other words, the tongue on each arm is joined with the body of that arm by a neck portion having edges which are substantially non-coincident with those extending from the main portion of the groove of that arm to the lateral edges of the arm. Hence when the square is assembled the neck portions of the tongues do not coincide or register with each other. As shown in Fig. 5, the edges 15 do not coincide with the edges at the open end of the groove 16 except at the extreme lateral edges of the square, and the extension 12 and tongue 17 are shaped to correspond, so that there is no transverse line or lines which can weaken the joint appreciably. It will therefore be understood that by my improved construction a very strong joint is provided, which is practically as strong as any part of the square.

Some suitable locking device should obviously be provided to lock the arms in the assembled position, but as this feature forms no part of the present invention, I have not referred to it in detail. In the form shown, I have indicated, generally, a locking device 19 associated with the tongue 14 to lock said tongue to the arm 11. As there is no locking device associated with the tongue 17, said tongue may be made considerably shorter than the tongue 14, as shown, but, of course, this is not essential in many of the various aspects of the invention, and if desirable, a suitable locking device could be used in connection with the tongue 17. Other modifications will also suggest themselves to those skilled in the art.

What I claim is:

1. In a separable square, an arm having a transverse extension, said arm and extension having a shallow lengthwise groove crossing the line of juncture therebetween and open at the free end of the extension but terminating short of the outside edge of said arm, a tongue extending from the end of said extension, a second arm, and a tongue extending lengthwise from said second arm adapted to fit the groove in said extension, and similarly crossing the line of juncture between said first mentioned arm and its extension, said second arm having at one face a shallow groove adapted to receive the tongue on the end of said extension; substantially as described.

2. In a separable square, an arm having a transverse extension, said extension having a shallow lengthwise groove open at the free end of the extension but terminating short of the outside edge of said arm, a tongue extending from the end of said extension, a second arm, and a tongue extending lengthwise from said second arm and adapted to fit the groove in said extension, said second arm having at one face a shallow groove adapted to receive the tongue on the end of said extension; said tongues being joined with the respective arms by neck portions which are substantially non-coincident when the square is assembled; substantially as described.

3. In a separable square, the combination of two arms each having a groove, and a tongue on each arm adapted to fit the groove of the other arm, one of said tongues being joined with the corresponding arm by a neck portion which is substantially non-coincident with the junction of the other tongue with the other arm when the square is assembled; substantially as described.

4. In a separable square, the combination of two arms each having a groove having parallel side walls, and a tongue on each arm having similar parallel edges adapted to fit the groove of the other arm, each tongue being joined to its arm by a neck portion curved to gradually merge into the arm, and the neck portions being disposed in opposite relation one to the other to render them non-coincident when the square is assembled, substantially as and for the purpose described.

In witness whereof, I have hereunto set my hand on the 25th day of July, 1912.

JOHN H. SHAW.

Witnesses:
ROBERT MACARTHUR, Jr.,
BERTHA RAY.

Copies of this patent may be obtained for five cents each, by addressing the "Commissioner of Patents, Washington, D. C."